United States Patent
Mao et al.

(10) Patent No.: US 9,680,383 B2
(45) Date of Patent: Jun. 13, 2017

(54) INPUT OVERVOLTAGE PROTECTION USING CURRENT LIMIT

(71) Applicant: Power Integrations, Inc., San Jose, CA (US)

(72) Inventors: Mingming Mao, Saratoga, CA (US); Ricardo Luis Janezic Pregitzer, Campbell, CA (US); Michael Yue Zhang, Mountain View, CA (US); Tiziano Pastore, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/884,592

(22) Filed: Oct. 15, 2015

(65) Prior Publication Data
US 2016/0134197 A1    May 12, 2016

Related U.S. Application Data

(60) Provisional application No. 62/076,985, filed on Nov. 7, 2014.

(51) Int. Cl.
| | |
|---|---|
| *H02M 3/335* | (2006.01) |
| *H02M 1/32* | (2007.01) |
| *H02M 1/42* | (2007.01) |

(52) U.S. Cl.
CPC ......... *H02M 3/33515* (2013.01); *H02M 1/32* (2013.01); *H02M 1/42* (2013.01); *H02M 3/335* (2013.01); *Y02B 70/12* (2013.01)

(58) Field of Classification Search
CPC .................................................. H02M 3/335
See application file for complete search history.

(56) References Cited

U.S. PATENT DOCUMENTS

| | | | |
|---|---|---|---|
| 6,781,357 B2 * | 8/2004 | Balakrishnan .... | H02M 3/33507 323/235 |
| 8,391,030 B2 * | 3/2013 | Li ..................... | H02M 3/33515 363/21.16 |

(Continued)

FOREIGN PATENT DOCUMENTS

| | | |
|---|---|---|
| EP | 1912320 A2 | 4/2008 |
| EP | 1990903 A2 | 11/2008 |
| EP | 2779407 A2 | 9/2014 |

OTHER PUBLICATIONS

European Patent Application No. 15193242.3—Extended European Search Report, dated Apr. 1, 2016 (10 pages).

*Primary Examiner* — Emily P Pham
(74) *Attorney, Agent, or Firm* — Blakely Sokoloff Taylor & Zafman LLP

(57) ABSTRACT

A controller for use in a power converter includes a state selection circuit coupled to receive an input voltage sense signal representative of an input voltage, a switch current sense signal representative of a switch current of a power switch, and a feedback signal representative of an output quantity of the power converter. The state selection circuit is coupled to generate an input voltage signal in response to the input voltage sense signal, an input current signal in response to the switch current sense signal, and an input threshold signal in response to the feedback signal. A state machine circuit is coupled to the state selection circuit to generate a drive signal in response to the input voltage signal, the input current signal, and the input threshold signal to switch the power switch to control a transfer of energy from an input to an output of the power converter.

21 Claims, 6 Drawing Sheets

(56) References Cited

U.S. PATENT DOCUMENTS

| | | | | |
|---|---|---|---|---|
| 8,427,850 B2* | 4/2013 | Morota | ............ | H02M 3/33507 363/21.1 |
| 8,587,969 B2* | 11/2013 | Djenguerian | ......... | H02M 3/157 363/21.13 |
| 2011/0194314 A1 | 8/2011 | Morota et al. | | |
| 2012/0106209 A1* | 5/2012 | Wu | ....................... | H02M 3/335 363/21.18 |
| 2014/0268951 A1* | 9/2014 | Wang | ..................... | H02M 7/12 363/78 |

* cited by examiner

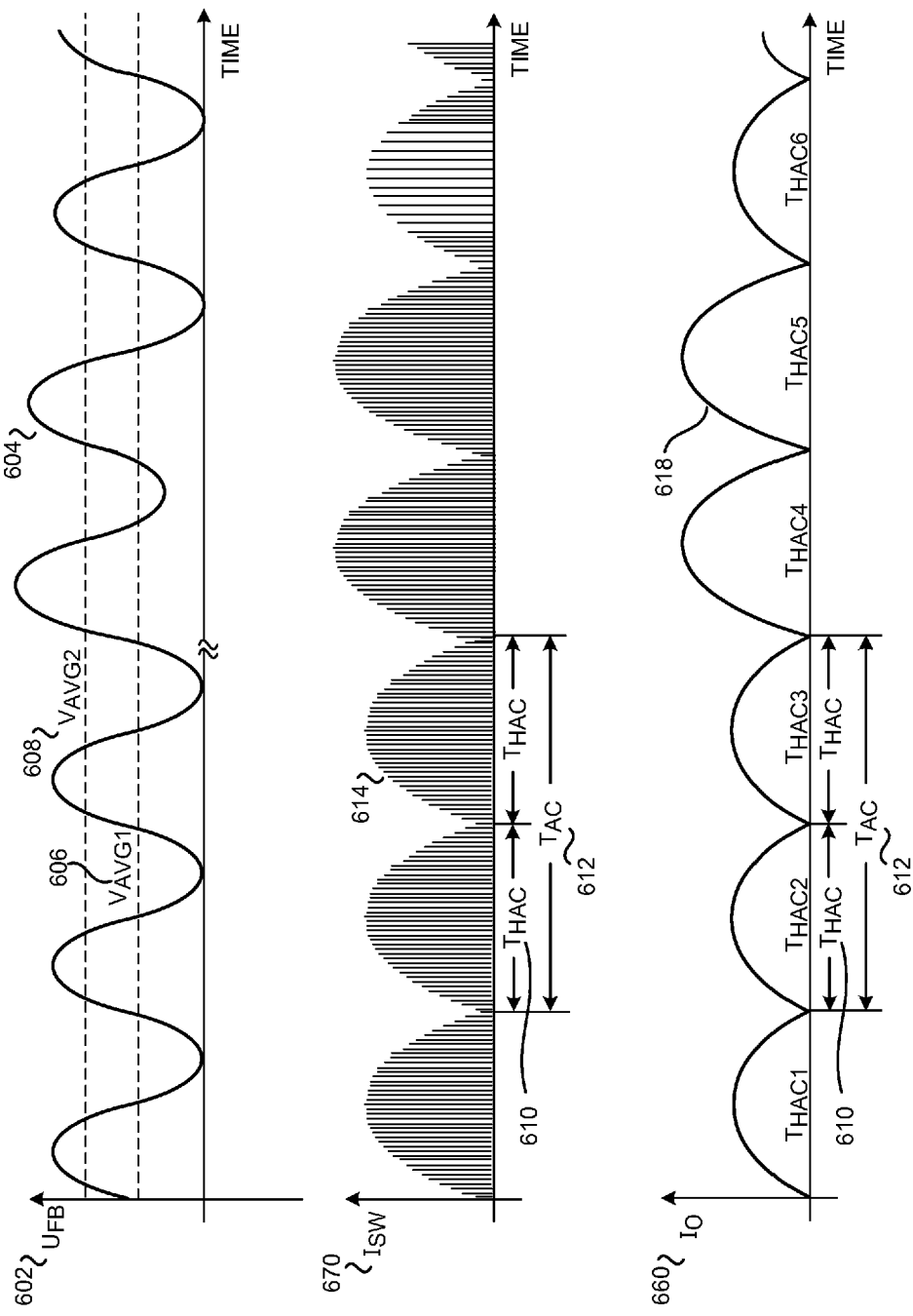

INPUT OVERVOLTAGE PROTECTION USING CURRENT LIMIT

CROSS-REFERENCE TO RELATED APPLICATIONS

This application claims the benefit of U.S. Provisional Application No. 62/076,985 filed on Nov. 7, 2014, the contents of which are incorporated herein by reference.

BACKGROUND INFORMATION

Field of the Disclosure

The present invention relates generally to power converters, and more specifically controllers that can detect an input over-voltage of a power converter.

Background

Electronic devices use power to operate. Switched mode power converters are commonly used due to their high efficiency, small size and low weight to power many of today's electronics. Conventional wall sockets provide a high voltage alternating current. In a switching power converter a high voltage alternating current (ac) input is converted to provide a well-regulated direct current (dc) output through an energy transfer element. The switched mode power converter control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Power converters are occasionally exposed to surges in the received input voltage, which is generally referred to as an overvoltage condition. A higher input voltage can result in a higher transfer of energy across the transformer. Switching of the power switch during these overvoltage conditions may damage various components within the power converter, such as a power switch or a light emitting diode (LED). Thus, many power converters include overvoltage protection circuits to detect the overvoltage conditions in order to prevent damage to the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is yet another example timing diagram illustrating waveforms of the feedback signal, the switch current, and the output current of an example power converter in accordance with the teachings of the present invention.

Figure 1:
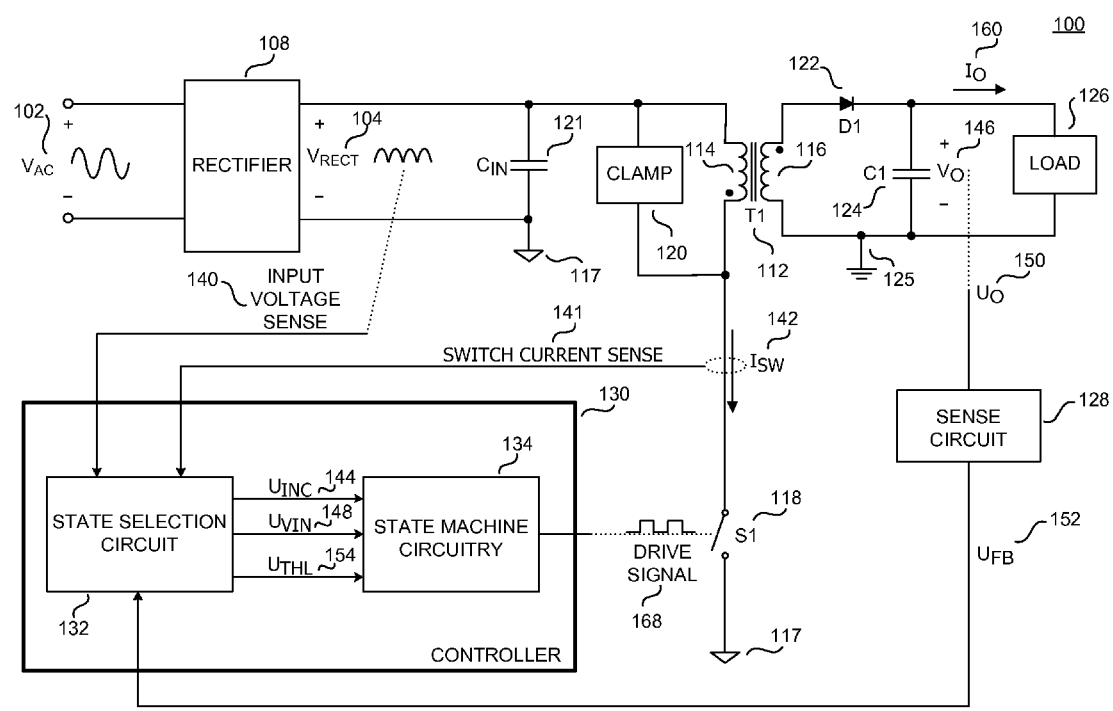
FIG. 1 is a diagram illustrating a power converter, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a power converter controller and a method of operating the power converter controller are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Power factor correction (PFC) controllers minimize the input current distortion by having the output current in phase with the voltage. In the disclosed examples, surges within the input of the power supply may occur. These surges are then transferred to the output that may exceed the recommended ratings of an LED output load. The PFC controller may take longer to detect a surge, which may lead to damaged LED components. Examples in accordance with the teachings of the present invention describe a method to detect input line surges to reduce the output LED current in the event of a line surge.

In FIG. 1, a functional block diagram of a power converter 100 is illustrated including ac input voltage $V_{AC}$ 102, a rectifier 108, a rectified voltage $V_{RECT}$ 104, an energy transfer element T1 112, a primary winding 114 of the energy transfer element T1 112, a secondary winding 116 of the energy transfer element T1 112, a switch S1 118, an input return 117, a clamp circuit 120, a rectifier D1 122, an input capacitor $C_{IN}$ 121, an output capacitor $C_O$ 124, a load 126, a sense circuit 128, and a controller 130. Controller 130 further includes a state selection circuit 132 and a state machine circuit 134.

In one example, sense circuit 128 may also be included in controller 130. FIG. 1 further illustrates an output voltage $V_O$ 146, an output current $I_O$ 160, an output quantity $U_O$ 150, a feedback signal $U_{FB}$ 152, an input voltage sense signal 140, a switch current $I_{SW}$ 142, a switch current sense signal 141 and a drive signal 168. The switched mode power converter 100 illustrated in FIG. 1 is configured in a flyback configuration, which is just one example of a switched mode power converter that may benefit from the teachings of the present invention. It is appreciated that other known topologies and configurations of switched mode power converter may also benefit from the teachings of the present invention.

In one example, the input capacitor $C_{IN}$ 121 filters the high frequency current from the switch S1 118. For other applications, the input capacitor $C_{IN}$ 121 may be large enough such that a substantially dc voltage is applied to the energy transfer element T1 110. However, for power supplies with power factor correction (PFC), a small input capacitor $C_{IN}$ 121 may be utilized to allow the voltage applied to the energy transfer element T1 112 to substantially follow the rectified voltage $V_{RECT}$ 104.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 104. In one embodiment, rectifier 108 may be a bridge rectifier. The rectifier 108 is coupled to the energy transfer element T1 112. In some embodiments of the present invention, the energy transfer element T1 112 may be a coupled inductor. In other embodiments, the energy transfer element T1 112 may be a transformer. In the example of FIG. 1, the energy transfer element T1 112 includes two windings, a primary winding 114 and a secondary winding 116. However, it should be appreciated that the energy transfer element T1 112 may have more than two windings. In the example of FIG. 1, primary winding 114 may be considered an input winding, and secondary winding 116 may be considered an output winding. The primary winding 114 is further coupled to switch S1 118, which is then further coupled to input return 117.

In addition, the clamp circuit 120 is illustrated in the example of FIG. 1 as being coupled across the primary winding 114 of the energy transfer element T1 112. An output is provided to the load 126 and may be provided as either a regulated output voltage $V_O$ 146, regulated output current $I_O$ 160, or a combination of the two. In one embodiment, the load 126 may be a light emitting diode (LED) array.

The power converter 100 further comprises circuitry to regulate the output, which is exemplified as output quantity $U_O$ 150. A sense circuit 128 is coupled to sense the output quantity $U_O$ 150 and to provide feedback signal $U_{FB}$ 152, which is representative of the output quantity $U_O$ 150. Controller 130 is coupled to the sense circuit 128 and receives the feedback signal $U_{FB}$ 152 from the sense circuit 128.

The controller 130 further includes terminals for receiving the input voltage sense signal 140, and switch current sense signal 141. In the example of FIG. 1, the input voltage sense signal 140 may be representative of the rectified voltage $V_{RECT}$ 104 and may be a voltage signal or a current signal. The switch current sense signal 141 may be representative of the switch current $I_{SW}$ 142 of the switch S1 118 and may be a voltage signal or a current signal. The switch current $I_{SW}$ 142 may be sensed in a variety of ways, such as for example the voltage across a discrete resistor or the voltage across a transistor when the transistor is conducting.

Controller 130 provides a drive signal 168 to the power switch S1 118. The drive signal 168 may provide various switching parameters to control the transfer of energy from the input of power converter 100 to the output of power converter 100. Examples of such parameters may include switching frequency, switching period, duty cycle, respective ON and OFF times of the power switch S1 118, or varying the number of pulses per unit time of the power switch S1 118.

Figure 2:
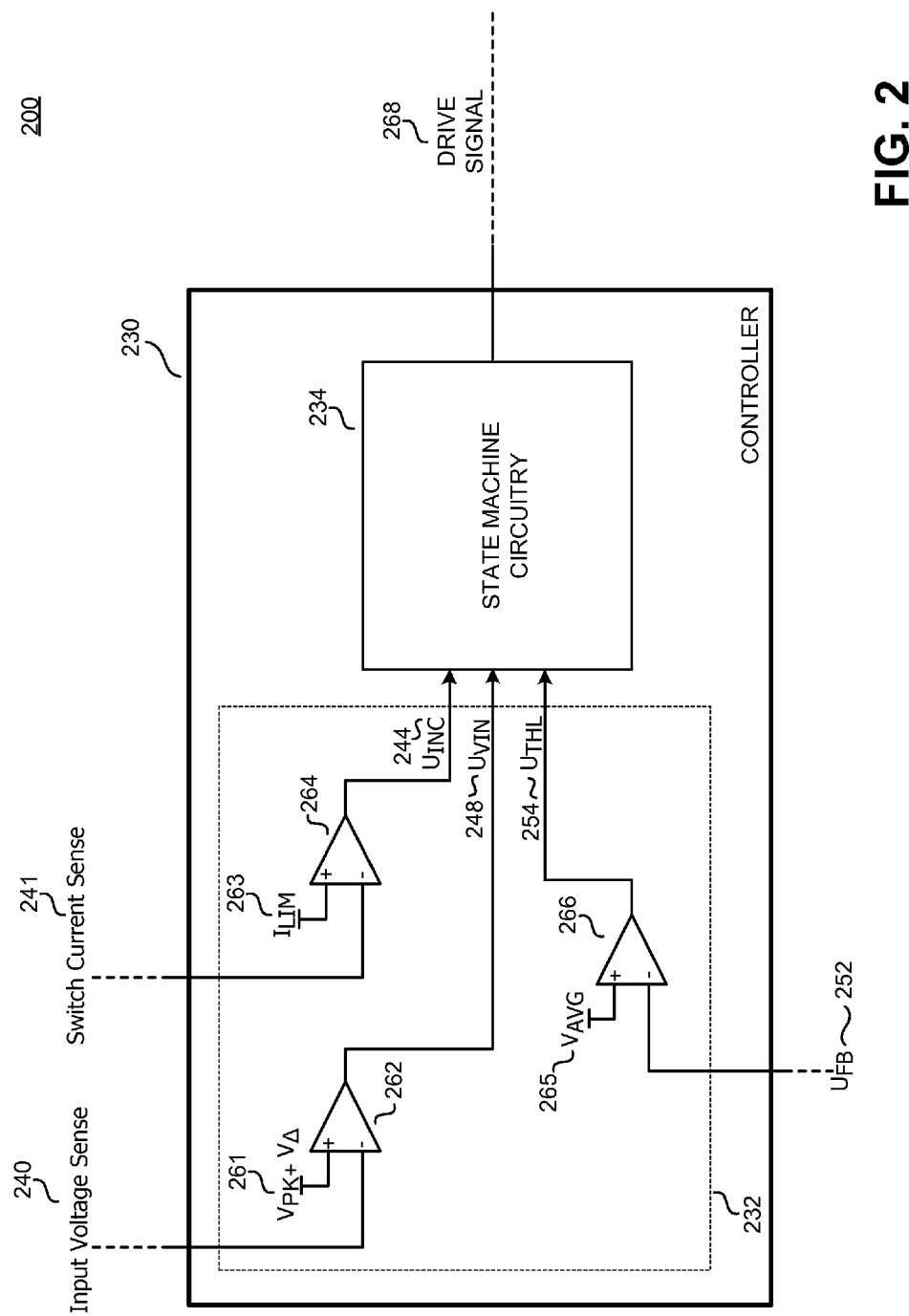
FIG. 2 is a diagram of the controller for the power converter, in accordance with the teachings of the present disclosure.

The state selection circuit 132 is coupled to the state machine circuit 134. The state selection circuit 132 determines three separate conditions: an input overvoltage, a switch current overload, and an output overload. If one of these conditions occur, the state selection circuit may transition the input voltage signal $U_{VIN}$ 148, input current signal $U_{INC}$ 144, and input threshold signal $U_{THL}$ 154. The state machine circuit 134 is coupled to receive the preceding signals, and outputs a drive a signal 168 to the switch S1 168. If any of the conditions are true, the controller reduces the switching frequency. Further details of how the state selection determines if an adjustment to the switching frequency is required are shown in FIG. 2. For a controller with power factor correction, the controller may take longer than a half line cycle to adjust the switching frequency when relying solely on the output feedback signal. The controller in accordance with the teachings of the present invention may adjust the switching frequency within a half line cycle by detecting the conditions mentioned previously.

FIG. 2 illustrates a functional block diagram of the controller 230. Controller 230 is coupled to receive input voltage sense signal 240, switch current sense signal 241, feedback signal 252 and is coupled to provide a drive signal 268 to the power switch S1, as shown in FIG. 1. Controller 230 further includes a state selection circuit 232 and a state machine circuit 234. Further shown are signals input voltage $U_{VIN}$ 248, switch current $U_{INC}$ 244, and input threshold signal $U_{THL}$ 254.

The state machine circuitry 134 can be implemented in different ways that may be comprised of analog circuitry, digital circuitry, and or both. The state machine circuitry 134 may be comprised of one or more states that adjust the frequency of the drive signal 268 within a half line cycle.

State selection 232 further includes comparators 262, 264, and 266. Comparator 262 detects for an input overvoltage. Comparator 262 is coupled to receive the input voltage sense signal 240 at the inverting input and is coupled to a voltage reference $V_{PK}+V_A$ 261. The reference voltage $V_{PK}+V_A$ determines if there is a surge in the input voltage. The peak voltage $V_{PK}$ may be a voltage threshold that can be set internally. $V_A$ is defined by the equation below.

$$V_A = V_{P(N)} - V_{P(N-1)} \tag{1}$$

$V_A$ represents a difference in two stored voltage values. The controller 230 stores the value of the peak voltage. In this example, the first peak value is stored as $V_{P(N-1)}$. In subsequent half line cycles, if a higher input voltage is recorded, the new peak value input voltage is stored as $V_{P(N)}$. Comparator 262 is coupled to output a signal $U_{VIN}$ 248 to the state machine circuit 234. The input voltage signal 248 transitions to a logic high if the input voltage is greater than the voltage reference.

Comparator 264 detects for an input over current condition of the switch in FIG. 1. Although the input voltage may not have exceeded an input overvoltage condition, the LEDs coupled to the output of the power converter may still be operating above their normal parameters. The input current rating should never be exceeded because a higher input current may indicate a possible higher output current. Comparator 264 is coupled to receive the switch current sense circuit signal 241 at the inverting input and to a current reference $I_{LIM}$ 263 at the non-inverting input. If the switch current sense signal exceeds a current limit $I_{LIM}$ 263, the current signal $U_{INC}$ 244 transitions to a logic high. This current limit measures how much current the switch can handle to operate safely and is different from a current limit used for ON/OFF control for example. State machine circuit receives the current signal $U_{INC}$ 244, and reduces the switch frequency of the drive signal 268 for switch S1.

Although the switch current may not exceed the current limit, the LEDs may still be operating above normal operating conditions. Comparator 266 detects for a higher than average output. Comparator 266 is coupled to receive a feedback signal $U_{FB}$ 252 at the inverting input and is coupled to a feedback threshold reference 265 at the non-inverting input. If the feedback signal is greater than the average signal, the input threshold signal $U_{THL}$ 254 transitions to a logic high. State machine circuit receives the input threshold signal $U_{THL}$ 254, and reduces the switching frequency of the drive signal 268.

Figure 3:
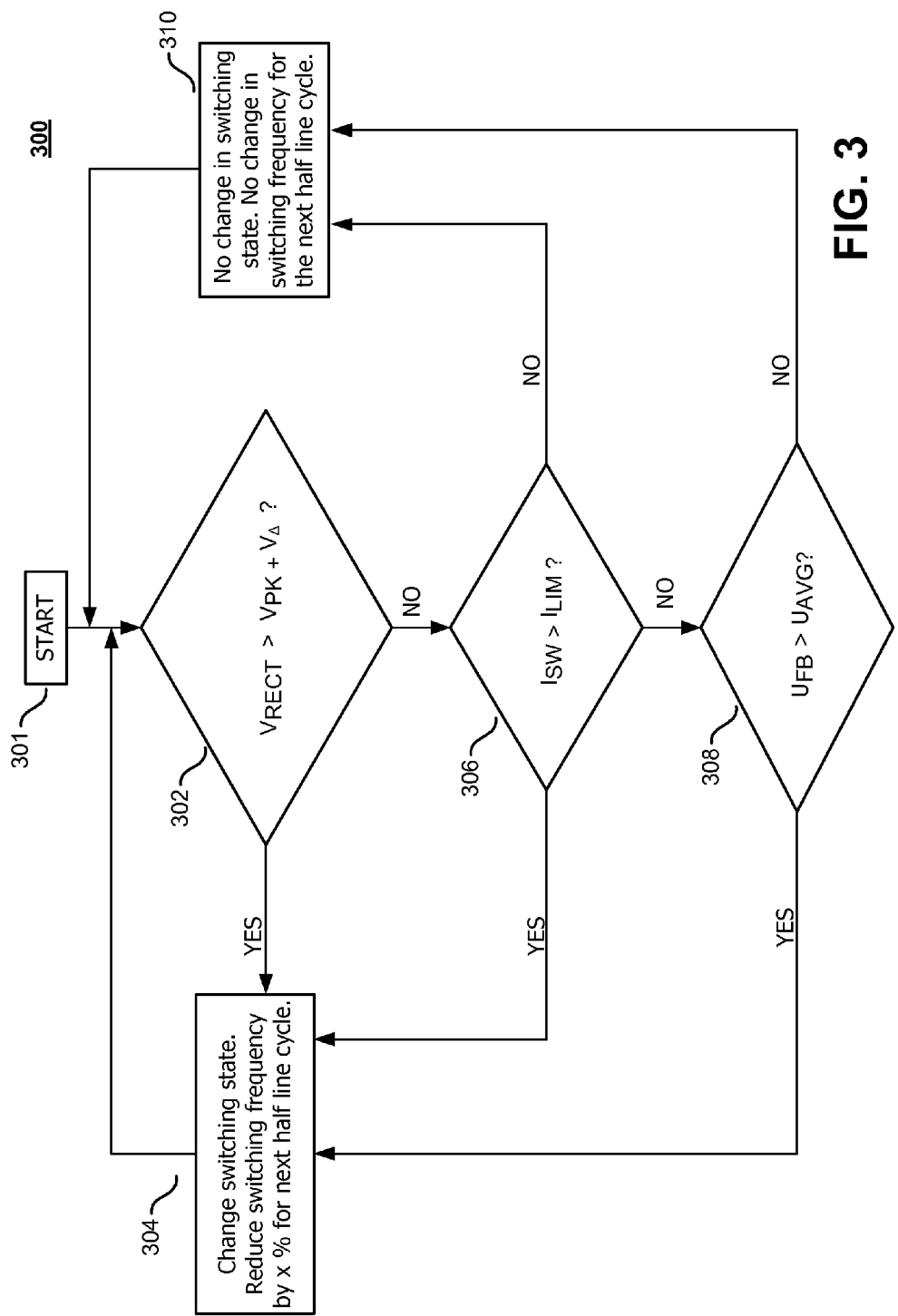
FIG. 3 is a flow diagram illustrating an example process for detecting an overvoltage condition, in accordance with the teachings of the present invention.

FIG. 3 is a flow diagram illustrating an example process 300 for determining an overvoltage condition. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

Process 300 begins at START block 301 and continues to decision block 302. At decision block 302, process 300 determines if the input voltage signal is above the voltage reference $V_{PK}+V\Delta$. If the condition is true, process 300 proceeds to decision block 304. The current switching state of the state machine circuit is changed and the switching frequency is reduced by a percentage for the next half line cycle. Process 300 then returns to the START block 301.

If the input voltage sense signal is not above the voltage reference $V_{PK}+V\Delta$, process 300 proceeds to decision block 306. At decision block 306, process 300 determines if the switch current sense signal is above the current limit threshold. If the condition is true, process 300 then proceeds to block 304. At process block 304, the current switching state of the state machine sets a lower switching frequency of the power switch to reduce the switch current by the amount it is above current limit threshold for the next half line cycle. Process 300 then returns to the START 301.

If the switch current signal is not above the current limit, process 300 proceeds to decision block 308. Process 300 determines if the feedback signal is greater than an average signal. If the condition is true, process 300 then proceeds to process block 304. At process block 304, the switching state is set to lower a switching frequency of the power switch by an amount feedback signal is above the threshold. Process 300 then returns to the START block 301.

If the condition is not true, process 300 proceeds to block 310. At block 310, there is no change in switching state, whereby the switching frequency remains the same for the next half line cycle. Process 300 the returns to the START 301.

Examples of the detection are found there forth. The detection of an input transient such as overvoltage or overcurrent condition occurs between two peaks of the rectified input voltage, also known as a half line cycle. For a 50 Hz line frequency, an input transient condition can be detected in 10 milliseconds, and 8.7 milliseconds for a 60 Hz line frequency respectively. However, an output feedback signal in one example can be detected over a complete line cycle. For a 50 Hz line frequency, an output transient condition can be detected in 20 milliseconds, and 16.7 milliseconds for a 60 Hz frequency.

Figure 4:
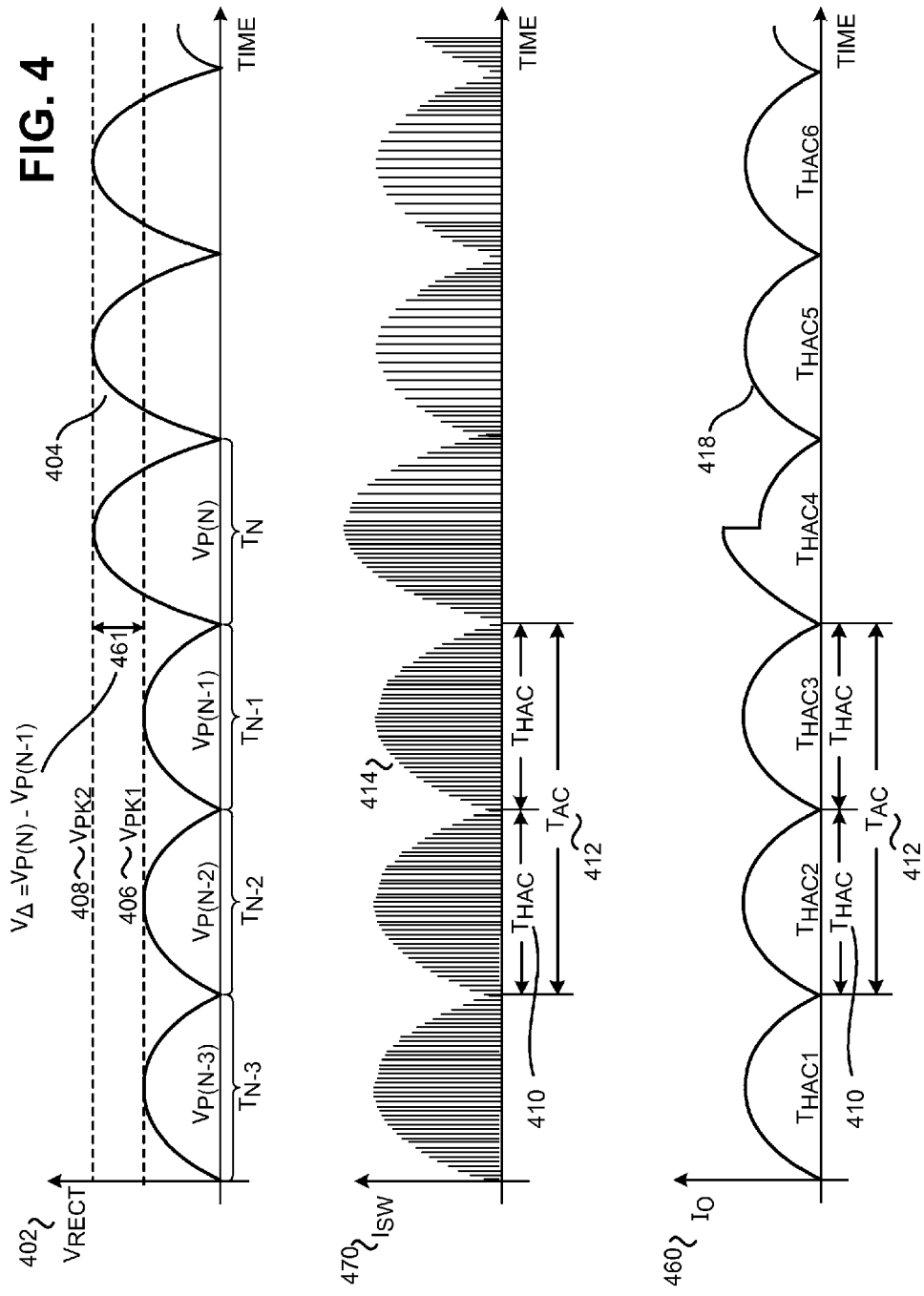
FIG. 4 is an example timing diagram illustrating waveforms of an input rectified voltage, the switch current, and output current of an example power converter in accordance with the teachings of the present invention.

FIG. 4 is an example timing diagram illustrating example waveforms of the input voltage, the switch current, and output current of an example power converter in accordance with the teachings of the present invention. In the first timing diagram, the horizontal axis represents the time and a vertical axis represents the rectified input voltage $V_{RECT}$ 402. A half line cycle is represented by $T_{HAC}$ 410, and a full line cycle is represented by $T_{AC}$ 412. The peak of the rectified input voltage has a first value $V_{P(N-3)}$, a second value $V_{P(N-2)}$, and a third value $V_{P(N-1)}$ from half line cycles $T_{N-3}$ until $T_{N-1}$. The controller stores the value of $V_{P(N-3)}$ as the first peak value $V_{PK1}$ 406. The controller does not store a new peak value if the peak rectified input voltage in the current cycle does not exceed the first peak value $V_{PK1}$ 406. Thus, in half line cycle $T_{N-2}$ and half line cycle $T_{N-1}$, the first peak value $V_{PK1}$ 406 does not change. At time period $T_N$, the rectified input voltage rises to a new peak value $V_{P(N)}$, and that value is stored as $V_{PK2}$. As defined above, $V_\Delta$ can be expressed by, $$V\Delta_A = V_{P(N)} - V_{P(N-1)} \tag{1}$$

From FIG. 4, equation 1 represents the difference of the two dashed lines, which correspond to the values first peak value $V_{PK1}$ 406 and second peak value $V_{PK2}$ 408.

The second timing diagram illustrates the switch current, represented in waveform 414. Each pulse of the switch current represents a switching cycle. The switch current during time period $T_{N-3}$ until $T_{N-1}$ is illustrated during normal operation. At a time cycle $T_N$, the switch current rises due to the increased rectified input voltage 402. During the fourth half line cycle, the controller will begin to reduce the switching frequency, and the switch current envelope pulses spread out further. This reduces the overall switch current. As shown in FIG. 4, the time between switch current pulses increases.

The third timing diagram illustrates the output current $I_O$ 460 represented by waveform 418. The output current $I_O$ 460 is in normal operating conditions during half line cycles $T_{HAC1}$, $T_{HAC2}$, $T_{HAC3}$. At half line cycle $T_{HAC4}$, the output current rises above a threshold due to a surge in the rectified input voltage 402. The controller reduces the switching frequency during half line cycle $T_{HAC4}$, until the output current $I_O$ 460 is reduced to normal operation as seen by half line cycles $T_{HAC5}$ and $T_{HAC6}$.

Figure 5:
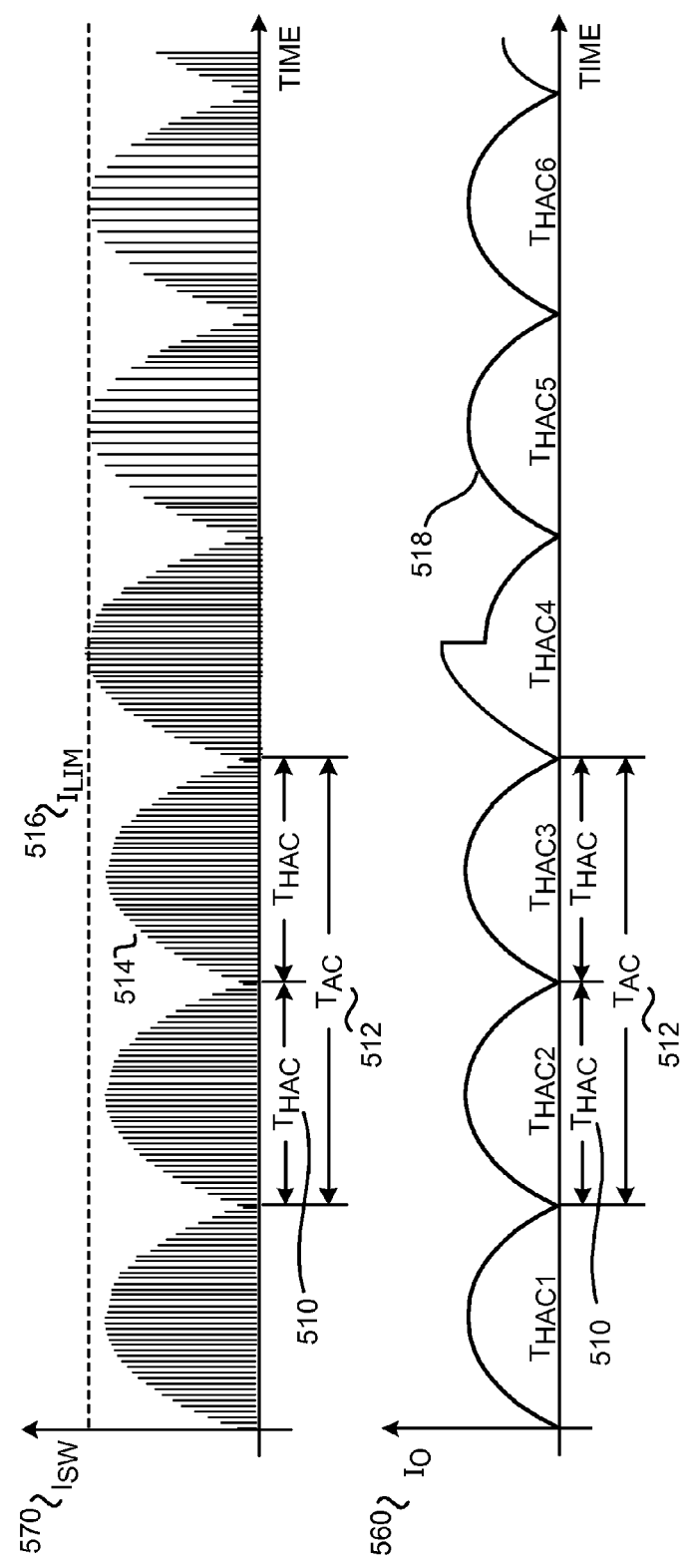
FIG. 5 is another example timing diagram illustrating waveforms of the switch current, the switch current, and the output current of an example power converter in accordance with the teachings of the present invention.

FIG. 5 is an example timing diagram illustrating example waveforms of the switch current and output current. These two timing diagrams illustrate the controller adjusting the switching frequency in response to the switch current exceeding a current limit, which in turn reduces the output current as a preventive measure.

In the first timing diagram, the vertical axis represents the switch current $I_{SW}$ 570 and the horizontal axis represents by time. A half line cycle is represented by $T_{HAC}$ 510 and a full line cycle is represented by $T_{AC}$ 512. In the second timing diagram, the vertical axis represents by the output current $I_O$ 560 and the horizontal axis represents time.

The switch current is represented by waveform 514. The switch current $I_{SW}$ 570 during the first three half line cycles operates in normal condition. The corresponding output current during the first half line cycle $T_{HAC1}$, the second half line cycle $T_{HAC2}$, and the third half line cycle $T_{HAC3}$ operates in normal condition.

At the fourth half line cycle, the switch current $I_{SW}$ 570 rises above the current limit threshold $I_{LIM}$ 516. This affects the output current $I_O$ 506 as seen in the fourth half line cycle $T_{HAC4}$ of the second timing diagram. In response, the state machine circuit in the controller reduces the output current $I_O$ 560 within the fourth half line cycle with a lower switching frequency of the power switch. During the fifth and sixth half line cycles, the switch current envelope $I_{SW}$ 570 may still reach the current limit $I_{LIM}$ 516, but the reduction of the switching frequency has decreased the amount of pulses. The decreased amount of pulses of the switch current $I_{SW}$ 570 leads to a decrease in the output current $I_O$ 560.

FIG. 6 is an example timing diagram illustrating example waveforms of the feedback signal, the switch current, and output current. In this diagram, neither the input voltage or switch current conditions have been met to indicate the output current will exceed safe operating levels. In this example, the controller senses the feedback signal to indicate if the output current may exceed the safe operating level.

In the first time diagram, the vertical axis represents the feedback signal $U_{FB}$ 602 with a waveform 604. The horizontal axis represents time. In the second timing diagram, the vertical is represented by the switch current $I_{SW}$. In the third timing diagram, the vertical axis is represented by output current $I_O$ 660 with a waveform 618. A half line cycle is represented by $T_{HAC}$ 610 and a full line cycle is represented by $T_{AC}$ 612. A time shift period 605 may indicate one or line cycles have occurred.

The feedback signal has an average value $U_{AVG}$ 606 during the first, second, and third half line cycles of the first timing diagram. The controller stores the average value $U_{AVG}$ 606 every full line cycle. After a time shift period 605 of one or more line cycles, illustrated as the fourth half line cycle in FIG. 6, the feedback signal $U_{FB}$ value rises to a new average value $U_{AVG2}$ 608. This indicates the feedback signal has exceeded an average value and the switching frequency of the power switch should be reduced.

In the second timing diagram, the switch current $I_{SW}$ 670 during the first, second, and third half line cycle are illustrated under normal operation. At the fourth half line cycle, the switch current $I_{SW}$ 670 rises, but not to the current limit shown in FIG. 5 that would indicate a current limit of switch has been breached.

In the third timing diagram, the first half line cycle $T_{HAC1}$, second half line cycle $T_{HAC2}$, and third half line cycle $T_{HAC3}$, the output current operates in normal condition. At the fourth half line cycle $T_{HAC4}$, the output current $I_O$ 660 rises substantially. The controller does not reduce the switching frequency within a half line cycle. It may take the controller, one or more switching cycles before the switching frequency is reduced and the output current returns to safe operating levels.

In this example, the switching frequency is reduced in the sixth half line cycle, as seen by the switch current pulses spreading out. This in turn reduces the output current $I_O$ 660 to safe operating levels.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
   a state selection circuit coupled to receive an input voltage sense signal, a switch current sense signal, and a feedback signal, wherein the input voltage sense signal is representative of an input voltage of the power converter, wherein the switch current sense signal is representative of a switch current of a power switch of the power converter, wherein the feedback signal is representative of an output quantity of the power converter, wherein the state selection circuit is coupled to determine an input overvoltage in response to the input voltage sense signal, wherein the state selection circuit is coupled to determine a switch current overload in response to the switch current sense signal, and wherein the state selection circuit is coupled to determine an output overload in response to the feedback signal, wherein the state selection circuit includes:
      a voltage comparator coupled to receive the input voltage sense signal and a peak voltage signal, wherein the voltage comparator is coupled to output an input voltage signal in response to the input voltage sense signal and the peak voltage signal;
      a current limit comparator coupled to receive the switch current sense signal and a current limit signal wherein the current limit comparator is coupled to output an input current signal in response to the switch current sense signal and the current limit signal; and
      a feedback comparator coupled to receive the feedback signal and a feedback threshold signal, wherein the feedback comparator is coupled to output an input threshold signal in response to the feedback signal and the feedback threshold signal; and
   a state machine circuit coupled to the state selection circuit to receive the input voltage signal, the input current signal, and the input threshold signal, wherein the state machine circuit is coupled to generate a drive signal in response to the input voltage signal, the input current signal, and the input threshold signal to control switching of the power switch to control a transfer of energy from an input of the power converter to an output of the power converter, wherein an output current of the power converter is coupled to be in phase with the input voltage of the power converter, and wherein the output current of the power converter is coupled to be reduced in response to a reduction of a switching frequency of the drive signal within a half line cycle.

2. The controller of claim 1 wherein the state machine circuit is further coupled to reduce a switching frequency of the drive signal if the input voltage sense signal is greater than the peak voltage signal.

3. The controller of claim 1 wherein the state machine circuit is further coupled to reduce a switching frequency of the drive signal if the switch current sense signal reaches the current limit signal.

4. The controller of claim 1 wherein the state machine circuit is further coupled to reduce a switching frequency of the drive signal if the feedback signal is greater than the feedback threshold signal.

5. The controller of claim 1 wherein the input voltage sense signal is coupled to be responsive to a rectified voltage responsive to the input voltage of the power converter.

6. The controller of claim 5 wherein the controller is coupled to measure a peak voltage of each half line cycle of the rectified voltage of the input voltage of the power converter, wherein the state machine circuit is further coupled to reduce a switching frequency of the drive signal if a peak voltage of a current half line cycle of the rectified voltage is greater than a peak voltage of a preceding half line cycle of the rectified voltage by a threshold voltage amount.

7. The controller of claim 1 wherein the controller is coupled to measure a switch current envelope in response to the switch current sense signal, wherein the state machine circuit is further coupled to reduce a switching frequency of the drive signal if the switch current envelope reaches a threshold current limit.

8. The controller of claim 1 wherein the controller is coupled to measure an average value of the feedback signal, wherein the state machine circuit is further coupled to reduce a switching frequency of the drive signal if the average value of the feedback signal reaches a threshold feedback signal value.

9. A method of controlling a power converter, comprising:
generating a drive signal to control switching of a power switch to control a transfer of energy from an input of the power converter to an output of the power converter;
receiving an input voltage sense signal representative of an input voltage of the power converter;
receiving a switch current sense signal representative of a switch current of the power switch;
receiving a feedback signal representative of an output quantity of the power converter;
reducing a switching frequency of the drive signal if the input voltage sense signal is greater than a peak voltage signal;
reducing a switching frequency of the drive signal if the switch current sense signal is greater than a current limit signal;
reducing a switching frequency of the drive signal if the feedback signal is greater than a feedback threshold signal; and
further reducing an output current of the power converter in response to said reducing the switching frequency of the drive signal.

10. The method of claim 9 further comprising rectifying the input voltage to generate a rectified voltage, wherein the input voltage sense signal is responsive to the rectified voltage.

11. The method of claim 10 further comprising measuring a peak voltage of each half line cycle of the rectified voltage of the input voltage of the power converter, wherein said reducing the switching frequency of the drive signal if the input voltage sense signal is greater than the peak voltage signal comprises reducing the switching frequency of the drive signal if a peak voltage of a current half line cycle of the rectified voltage is greater than a peak voltage of a preceding half line cycle of the rectified voltage by a threshold voltage amount.

12. The method of claim 9 further comprising measuring a switch current envelope in response to the switch current sense signal, wherein said reducing the switching frequency of the drive signal if the switch current sense signal is greater than the current limit signal comprises reducing a switching frequency of the drive signal if the switch current envelope reaches a threshold current limit.

13. The method of claim 9 further comprising measuring an average value of the feedback signal in response to the feedback signal, wherein said reducing the switching frequency of the drive signal if the feedback signal is greater than the feedback threshold signal comprises reducing the switching frequency of the drive signal if the average value of the feedback signal reaches a threshold feedback signal value.

14. A power converter, comprising:
an energy transfer element coupled between an input of the power converter and an output of the power converter;
a power switch coupled to the energy transfer element; and
a controller coupled to generate a drive signal coupled to control switching of the power switch to control a transfer of energy from the input of the power converter to the output of the power converter, wherein the controller includes:
a state selection circuit coupled to receive an input voltage sense signal, a switch current sense signal, and a feedback signal, wherein the input voltage sense signal is representative of an input voltage of the power converter, wherein the switch current sense signal is representative of a switch current of the power switch, wherein the feedback signal is representative of an output quantity of the power converter, wherein the state selection circuit is coupled to determine an input overvoltage in response to the input voltage sense signal, wherein the state selection circuit is coupled to determine a switch current overload in response to the switch current sense signal, and wherein the state selection circuit is coupled to determine an output overload in response to the feedback signal, wherein the state selection circuit includes:
a voltage comparator coupled to receive the input voltage sense signal and a peak voltage signal, wherein the voltage comparator is coupled to output an input voltage signal in response to the input voltage sense signal and the peak voltage signal;
a current limit comparator coupled to receive the switch current sense signal and a current limit signal wherein the current limit comparator is coupled to output an input current signal in response to the switch current sense signal and the current limit signal; and
a feedback comparator coupled to receive the feedback signal and a feedback threshold signal, wherein the feedback comparator is coupled to output an input threshold signal in response to the feedback signal and the feedback threshold signal; and a state machine circuit coupled to the state selection circuit to receive the input voltage signal, the input current signal, and the input threshold signal, wherein the state machine circuit is coupled to generate the drive signal in response to the input voltage signal, the input current signal, and the input threshold signal to control switching of the power switch, wherein an output current of the power converter is coupled to be in phase with the input voltage of the power converter, and wherein the output current of the power converter is coupled to be reduced in response to a reduction of a switching frequency of the drive signal within a half line cycle.

15. The power converter of claim 14 wherein the state machine circuit is further coupled to reduce a switching frequency of the drive signal if the input voltage sense signal is greater than the peak voltage signal.

16. The power converter of claim 14 wherein the state machine circuit is further coupled to reduce a switching frequency of the drive signal if the switch current sense signal reaches the current limit signal.

17. The power converter of claim 14 wherein the state machine circuit is further coupled to reduce a switching frequency of the drive signal if the feedback signal is greater than the feedback threshold signal.

18. The power converter of claim 14 further comprising a rectifier coupled to the input of the power converter to generate a rectified voltage in response to the input voltage, wherein the input voltage sense signal is coupled to be responsive to the rectified voltage.

19. The power converter of claim 18 wherein the controller is coupled to measure a peak voltage of each half line cycle of the rectified voltage, wherein the state machine circuit is further coupled to reduce a switching frequency of the drive signal if a peak voltage of a current half line cycle of the rectified voltage is greater than a peak voltage of a preceding half line cycle of the rectified voltage by a threshold voltage amount.

20. The power converter of claim 14 wherein the controller is coupled to measure a switch current envelope in response to the switch current sense signal, wherein the state machine circuit is further coupled to reduce a switching frequency of the drive signal if the switch current envelope reaches a threshold current limit.

21. The power converter of claim 14 wherein the controller is coupled to measure an average value of the feedback signal, wherein the state machine circuit is further coupled to reduce a switching frequency of the drive signal if the average value of the feedback signal reaches a threshold feedback signal value.

* * * * *